UNITED STATES PATENT OFFICE.

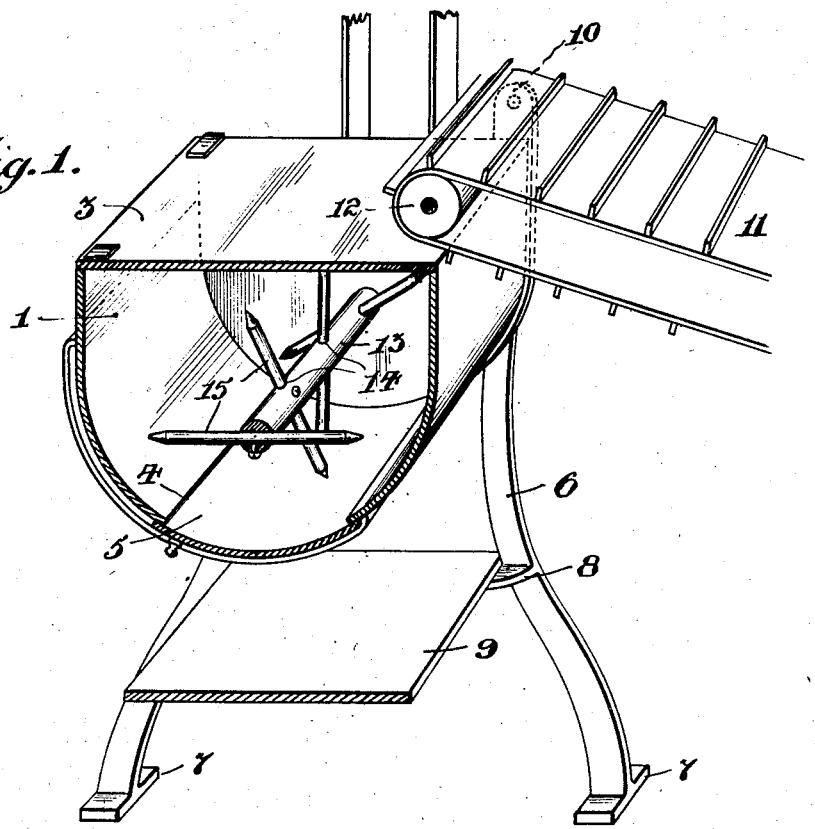
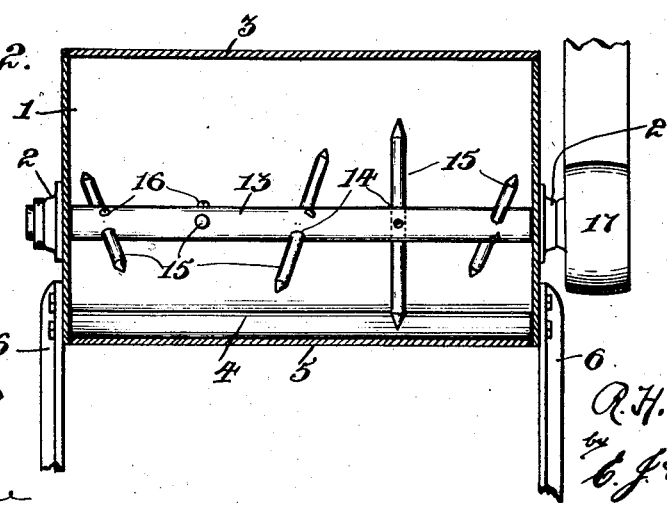

ROBERT HENRY DRISCOLL, OF AYLMER, QUEBEC, CANADA.

FEED-MIXER.

1,077,814.  Specification of Letters Patent.  Patented Nov. 4, 1913.

Application filed June 12, 1912. Serial No. 703,325.

*To all whom it may concern:*

Be it known that I, ROBERT HENRY DRISCOLL, a subject of the King of Great Britain, and resident of the town of Aylmer, in the county of Wright, in the Province of Quebec, in the Dominion of Canada, have invented certain new and useful Improvements in Feed-Mixers; and I do hereby declare that the following is a full, clear, and exact description of the same.

The invention relates to improvements in feed mixers, as described in the present specification and illustrated in the accompanying drawings that form part of the same.

The invention consists essentially in the novel construction and arrangement of parts, whereby the beaters or stirrers receive the feed ingredients of any nature from a suitable source of supply and thoroughly mix them.

The objects of the invention are to devise a form of mixer which will operate with hay or any other feed material, to simplify the construction of such machines, and generally to provide an efficient and durable apparatus.

In the drawings, Figure 1 is a sectional perspective view of the machine, showing the frame and casing broken away. Fig. 2 is a longitudinal sectional view of the machine.

Like numerals of reference indicate corresponding parts in each figure.

Referring to the drawings, 1 is a casing of U-shape form in cross-section, having the shaft bearings 2 in the end walls thereof, a cover 3, a discharge opening 4 in the bottom side, and the door 5 for closing said discharge opening.

6 are the standards supporting the casing 1, standing on the feet 7, and intermediate of their height having brackets 8 supporting the platform 9 under the discharge opening 4.

10 are bearings secured one to each side of the casing 1.

11 is an endless feed carrier having its roller 12 at one end journaled in the bearings 10, so that the feed ingredients are transported along the endless feed carrier and dumped into the casing 1, in which they are treated.

13 is a shaft of substantial dimensions journaled in the bearings 2 and having the holes 14 extending through the shaft at various angles and at various places throughout its length.

15 are the beaters or stirrers, pointed at each end and extending through the holes 14, having even lengths projecting at each side of the shaft and being held rigidly by the pins or screws 16.

The shaft 13 extends through one end of the casing and carries a pulley 17 for connecting the said shaft with suitable power.

In the operation of this invention the feed ingredients are transported as explained and the shaft 13 is rapidly rotated, the said feed being caught by the beaters and thrown here and there and everywhere within the casing, so that they become thoroughly mixed. The discharge of the mixture is through the opening 4 on to the platform 9, or into a suitable receptacle.

The particular form of the beaters may, of course, be changed, and they may be arranged somewhat differently, but the general idea of the invention is to have no parts inside which will permit a collection of the lighter feed ingredients, particularly such as hay, in any one part unless they are thoroughly mixed together with the heavier ingredients.

It must be understood that modifications may be made in the construction of this invention without departing from the spirit thereof, for instance, the door for the ingress opening in the casing may be done away with, and a hopper substituted for the feed in place of the endless carrier.

What I claim as my invention is:

A feed mixer comprising a semi-cylindrical casing having a removable cover and an outlet through the bottom opposite the open top and closed by a sliding door, means for distributing during feeding, a shaft journaled in the ends of said casing, means for driving said shaft, and rods pointed at the ends and inserted through the shaft at various angles and distances in relation to one another and forming stirrers adapted to catch the ingredients in different places and conditions and mix them.

Signed at the city of Ottawa, Ontario, Canada, this thirtieth day of April, 1912.

ROBERT HENRY DRISCOLL.

Witnesses:
P. A. SHEE,
C. PATENAUDE.